Jan. 1, 1946.  C. H. WHITE  2,392,018
DISK HARROW
Filed July 17, 1943  3 Sheets-Sheet 1

INVENTOR.
CHARLES H. WHITE
BY
ATTORNEYS

Jan. 1, 1946. C. H. WHITE 2,392,018
DISK HARROW
Filed July 17, 1943 3 Sheets-Sheet 2

INVENTOR.
CHARLES H. WHITE
BY
ATTORNEYS

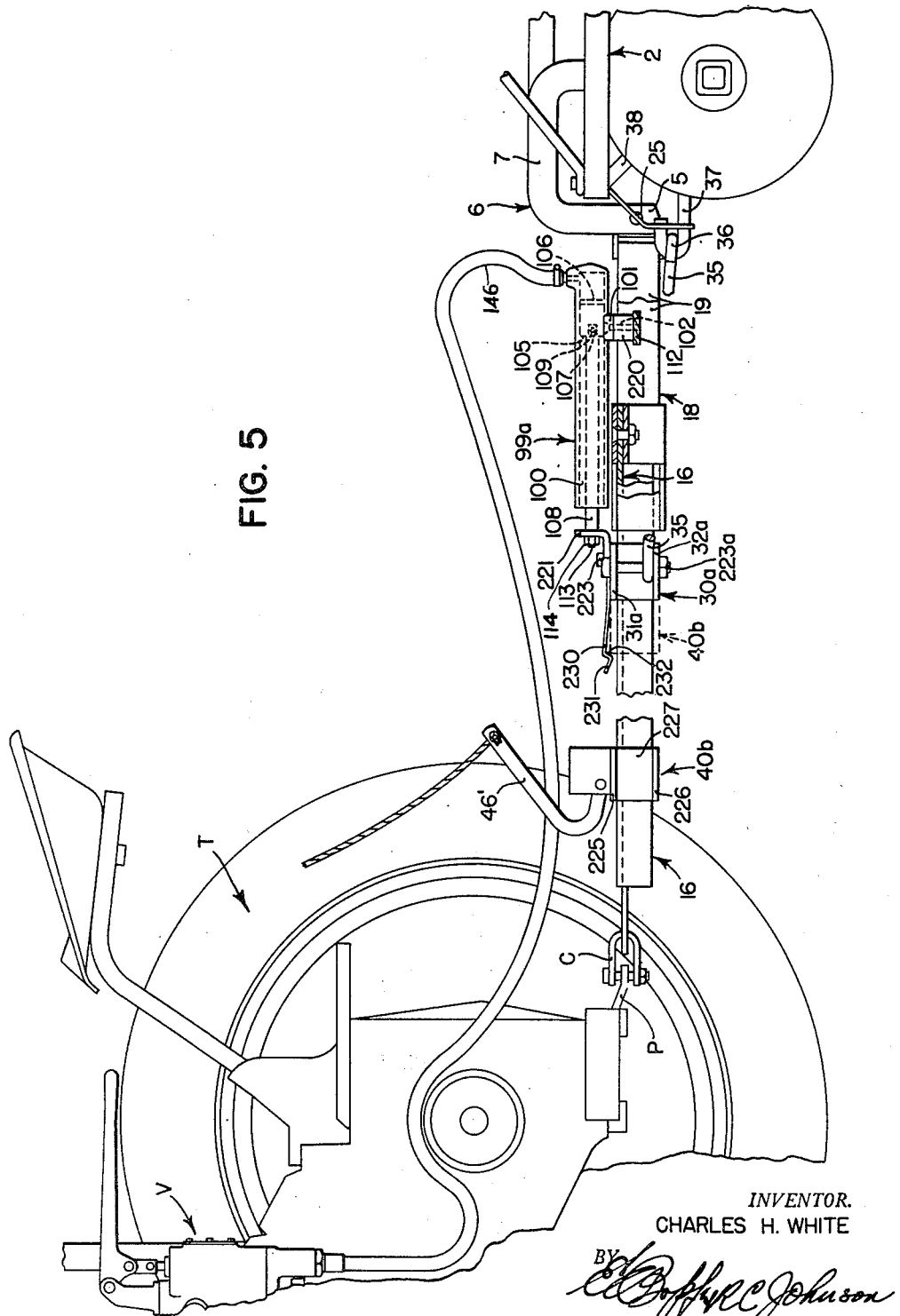

Patented Jan. 1, 1946

2,392,018

UNITED STATES PATENT OFFICE 2,392,018

DISK HARROW

Charles H. White, Moline, Ill., assignor to Deere & Company, Moline, Ill., a corporation of Illinois Application July 17, 1943, Serial No. 495,394

19 Claims. (Cl. 55—81)

This application is a continuation-in-part of my co-pending application, Serial No. 345,020, filed July 12, 1940, for Disk harrows, now U. S. Patent 2,338,698, issued January 11, 1944.

The object and general nature of the present invention is the provision of a disk harrow having a hydraulic power unit connected to force the disk gangs into their angled or working position, with associated mechanism including control means arranged so that the disk gangs may be moved into their straightened or non-working position by the pressure of the soil against the disks in their angled position.

Another feature of the present invention is the provision of a disk harrow having a power unit utilized for moving the disk gangs between their straightened and angled position and, in addition, arranged so that the disk gangs may also be moved into their straightened position by backing the tractor, when desired. More specifically, it is a feature of this invention to provide gang angling control means arranged to shift the gangs between their straightened and angled positions by power without requiring any interruption in the normal forward travel of the tractor but in which the parts are so arranged that, when necessary, the gangs may be straightened by backing the tractor.

An additional feature of this invention is the provision of hydraulic means for positively moving the gangs into their angled position, with means whereby the soil resistance against the angled gangs is utilized, when returning the gangs to their straightened position, for forcing the hydraulic fluid out of the cylinder at a relatively rapid rate, thereby providing for angling and straightening the harrow in a relatively short time.

These and other objects and advantages of the present invention will be apparent to those skilled in the art after a consideration of the following detailed description taken in conjunction with the accompanying drawings.

In the drawings:

Figure 5 is a fragmentary side view similar to Figure 2 and showing another form of the present invention including a hydraulic unit in which fluid pressure is utilized for moving the gangs into their angled position.

Figure 1:
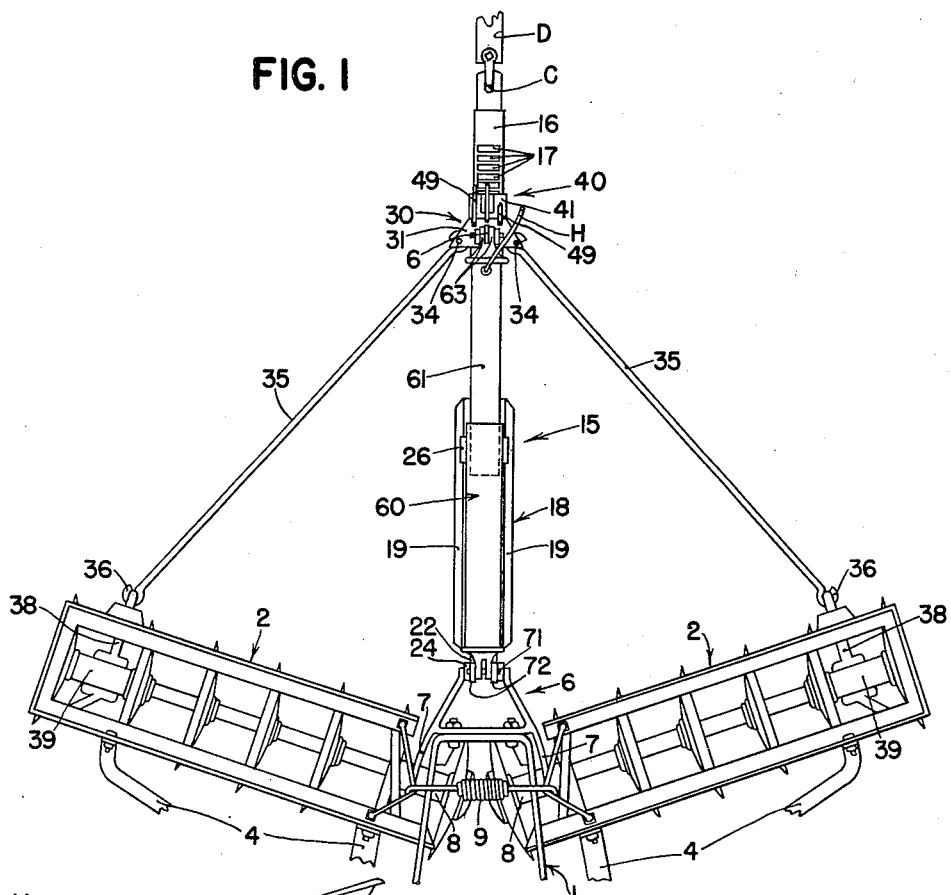
Figure 1 is a fragmentary plan view of a disk harrow in which the principles of the present invention have been incorporated, the harrow being shown in an angled or working position, being moved into that position by directing fluid under pressure into the ram unit carried by the harrow.

Referring now more particularly to Figure 1, the disk harrow, shown fragmentarily in the accompanying drawings, includes a frame 1, a pair of front gangs 2 pivotally connected to the frame 1, and a pair of rear gangs (not shown) also pivoted at their inner ends to the frame 1 and operatively connected through linkage 4 with the front gangs, this being the construction disclosed generally in my prior United States Patent No. 2,264,783, issued December 2, 1941, which was reissued June 8, 1943, as Re. 22,333. The frame 1 includes a forward extension 6, arms 7 of which turn downwardly to serve as the pivots for the inner bearings 8 of the front gangs. The harrow also includes suitable means, such as springs 9, for holding the front and rear gangs against upthrust, due to the fact that the center of soil resistance against the disks lies below the bearings to which the gang frames are connected.

The drawbar unit or hitch means of the harrow is indicated in its entirety by the reference numeral 15 and comprises a slidable drawbar proper, preferably in the form of a channel 16 having its flanges extending downwardly and with its web provided with a number of slots 17, and a companion drawbar member or frame means 18, preferably in the form of a pair of angles 19 connected together in spaced apart relation by a pair of upper and lower plates 21 welded or otherwise secured to the forward ends of the angles 19 and a rear U-shaped bracket 22 welded to the rear ends of the angles 19 and has rear ends apertured to embrace a block 24 pivoted at 25 to the downturned forward ends 5 of the frame 6. The channel 16 and the companion member 18 constitute what may be termed a drawbar unit or a drawbar construction. The block 24 is apertured vertically to receive a hitch or pivot pin 20 by which the rear end of the drawbar 15 is pivoted to the front end of the harrow frame 1, both for lateral and vertical swinging movement, as disclosed in my prior patent mentioned above. The drawbar channel 16, the forward end of which is hitched, as by a clevis C, to the drawbar D of the propelling tractor T, is slidable or shiftable between the upper and lower plates 21 and between the laterally spaced apart angles, as clearly shown in Figure 4, and is connected through draft links to be described later with the disk gangs to shift or swing them between straightened and angled or working positions. A pair of upper and lower guide plates, indicated at 26 and 27, are secured by a bolt 28 to the rear end of the drawbar channel 16 and serve as stops limiting the outward movement of the channel 16 by virtue of their engagement with the rear edges of the front plates 21, and normally the drawbar channel 16 occupies an extended position both in the straightened or transport position and the angled or working position of the gangs. However, under certain conditions the drawbar channel 16 may be shifted rearwardly, as will be explained below.

A front slide 30 is disposed about the drawbar channel 16 and comprises upper and lower plates 31 and 32 connected in any suitable way by side plates 33, the whole embracing the channel 16 in fairly close fitting relation. The slide 30 is freely movable along the drawbar channel 16 and has a pair of pivots 34 to which the front ends of a pair of draft links 35 are connected. The rear ends of the links 35 have hook portions 36 which engage with the forward looped parts 37 on the forward front gang bearing standards 38. The standards 38 are connected with the laterally outer bearings 39 of the front gangs 2. Thus, while the drawbar channel is in its extended position, forward and rearward movement of the slide 30 along the drawbar channel 16 results in forward and rearward swinging of the outer ends of the front gangs 2.

The forward movement of the slide 30 is limited by an adjustable latch or stop indicated in its entirety by the reference numeral 40. The stop 40 includes a pair of upper and lower plates 41 and 42 connected together by suitable side plates 43 so as to be freely slidable, when released from the drawbar channel 16, along the latter. A U-shaped bracket 44, disposed on the upper plate 41 in an inverted position, has pivoted thereto a latch lever 46, and the inner end of the latch lever 46 engages a dog 47 slidable in an opening in the bracket 44 and the adjacent portion of the upper plate 41. The lower end of the dog 47 is adapted to engage in one or the other of the drawbar openings 17, and when so engaged, the stop or latch 40 is locked to the drawbar channel 16. Since there are a number of openings 17, the stop member 40 may be fixed to the drawbar channel in any one of a number of different positions of adjustment. A spring catch 49 is secured at its rear end to the upper plate 31 of the slide 30 and at its forward end is formed with oppositely inclined slanting sections 51 and 52. The length of the spring catch 49 is sufficient to permit the section 52 to engage the front edge of the plate 41 when the rear slide 30 is in a forward position engaging the front slide 40 or when the latter is in a rear position, together with the channel 16, engaging the rear latch 30. A ram or piston and cylinder unit 60 is supported by the frame means 18 and comprises a cylinder 61 and a piston 62 movable therein. The cylinder 61 is provided with a pair of ears 63 and the latter are apertured to receive bolt means 64 connecting the cylinder rigidly to a bracket 65 that forms a part of the slide 30. A piston rod 69 is connected with the piston 62 and extends rearwardly from the cylinder 61, being connected, as at 71, to an upstanding U-shaped bracket 72 fixed to the upper portion of the hitch bracket 22. Conventionally, the connection 71 may be a bolt or the like, similar to or identical with the bolt means 64.

The hydraulic unit 60 is adapted for use with a source of pressure on the tractor controlled by a self-releasing valve mechanism V, whereby if the pressure in the hydraulic system rises to a predetermined degree, the pressure valve mechanism is tripped so that no more pressure is delivered to the cylinder 61. However, the hydraulic fluid is locked by the associated controlling valve mechanism in the cylinder, thereby retaining the pressure in the cylinder so that the outer ends of the gangs cannot drop back when the outfit is driven forwardly. Thus, the gangs are held in their angled or working position. It will also be noted that by connecting the front stop member 40 at different points on the front portion of the drawbar channel 16, the angled position of the gangs can be varied so as to vary the cut of the disks. The valve mechanism V above referred to is of the type that whenever the rear slide 30 engages the front slide 40, the valve is tripped but the fluid locked in the cylinder. This valve mechanism is substantially the same as shown and described in detail in the parent application, identified above, and hence further description is unnecessary here. A cable 75 is attached to the latch arm 46 so that the latter may be operated from the seat of a tractor. The controlling unit V is connected hydraulically with the ram unit 60 by a flexible hose H.

The operation of a harrow constructed according to the principles of the present invention is substantially as follows.

Figure 2:
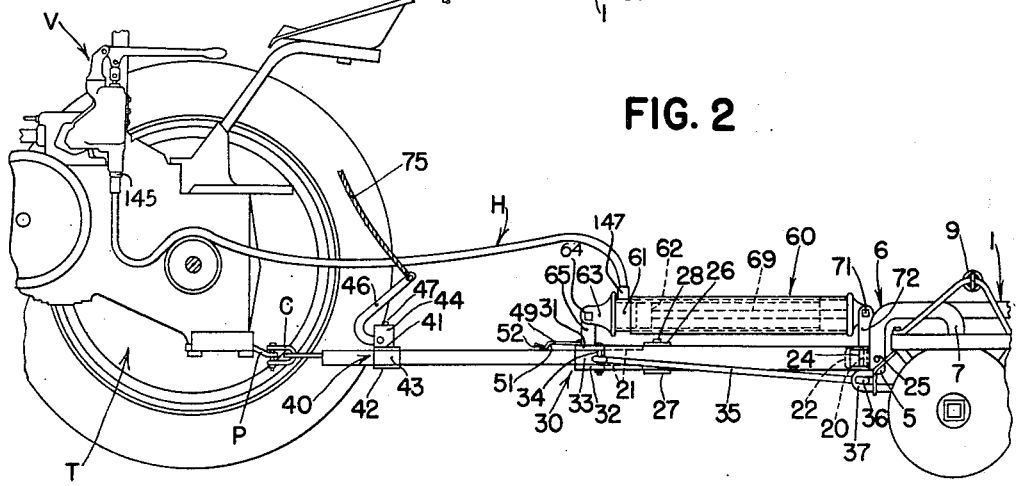
Figure 2 is a side view of the harrow shown in Figure 1.
Figure 3:
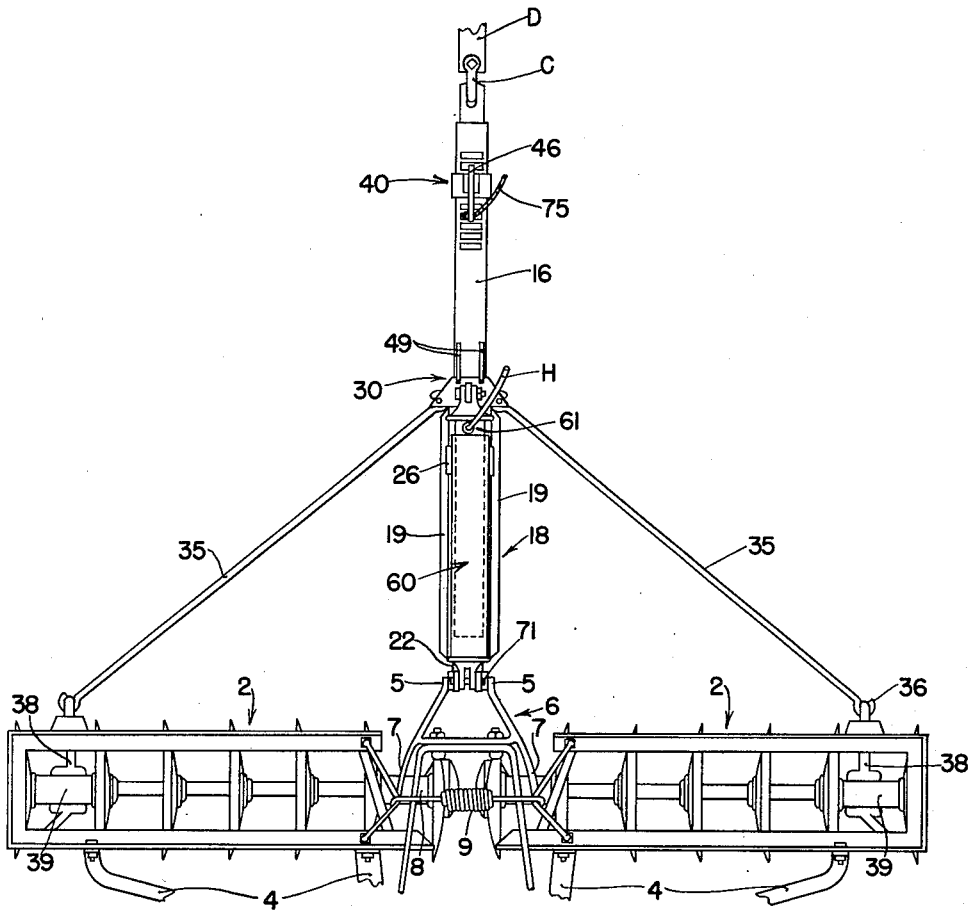
Figure 3 is a plan view showing the harrow after the fluid in the ram cylinder has been released and soil pressure against the disks has forced the gangs into their straightened position during the continued forward travel of the harrow.

The parts are shown in full lines in Figure 3 in the positions they occupy when the gangs are in their straightened position, that is, with the rear slide 30 back against the front end of the drawbar section 18. This is also the position of the parts shown in Figure 2, from which it will be noted that the piston 62 is at the inner or front end of the cylinder 61. The front slide or stop member 40 is in a position at the forward portion of the channel 16 defining the desired angle at which the disk harrow is to be operated.

When the farmer desires to shift the gangs from their straightened position into their angled position, he operates the valve mechanism above referred to so as to direct fluid under pressure into the front end of the cylinder 61, the fluid entering the cylinder through a hose line H leading from the controlling valve mechanism V on the tractor. The hydraulic fluid, preferably oil, directed into the cylinder 61 forces the piston 62 and the piston rod 69 rearwardly or outwardly, moving the rear slide 30 forwardly and thus acting through the draft links 35 to pull the outer ends of the gangs 2 into a forward or angled position, as shown in Figure 1. This may be done while the outfit is moving forwardly and it will be noted that the drawbar channel 16 remains in its extended position under normal conditions, whether the gangs are in their straightened or angled positions. The forward draft is transmitted from the drawbar channel 16 to the rear drawbar section 18 through the plates 26 and 27 which engage the rear edges of the plates 21.

When the farmer desires to straighten the gangs, all that he has to do is to release the oil or other hydraulic fluid from the cylinder 61, whereupon the piston 62 is permitted to move toward the front of the cylinder 61 and the resulting rearward movement of the slide 30 permits the outer ends of the gangs to fall back into their transport position (Figure 3). This may occur while the outfit as a whole is moving forwardly and the gangs move readily into their straightened or angled position since the soil pressure against the angled disks is of sufficient magnitude to cause the gangs immediately to go into their straightened position.

As so far described, the drawbar member 16 normally remains in an extended position and the gangs 2 are forced into their angled position by hydraulic power or permitted to fall back into their straightened position by releasing the hydraulic fluid. Mention was made above of the fact that the particular angle desired may be secured by disposing the front slide or stop member 40 in different positions. Assuming, for example, that the stop 40 is in an intermediate position of adjustment, resulting in the gangs operating at a moderate angle and that it is desired to increase the working angle of the disks, all that it is necessary for the farmer to do to increase the working angle of the gangs is to pull on the cable 75 for a brief period. This momentarily releases the front slide or stop 40, and if at the same time the farmer directs an additional quantity of fluid into the cylinder 61, the angle of the disks gangs will be increased. The farmer will release the cable 75 whenever the desired angle is attained whereupon the valve mechanism of the power unit will be automatically tripped as indicated above. In the event that the farmer desires to reduce the working angle, all that the farmer has to do is to pull on the cable 75 to release the latch 47 and then, while holding the latch released, operate the valve mechanism so as to momentarily relieve the oil pressure in the cylinder 61, whereupon the soil pressure against the disks will cause the outer ends to drop back. This will result in rearward movement of the slide 30, and since the spring members 49 engage the slide when the members 30 and 40 are adjacent one another, the slide 40 will be drawn rearwardly until the farmer releases the cable 75, at which time the dog 47 will engage in one of the openings in the drawbar channel 16. If the farmer desires at this moment to straighten the gangs, all he has to do is to operate the valve mechanism so as to continue the release of the oil pressure from the cylinder 61. The slide 30 will then move away from the stop member 40, the spring member 49 freeing itself from the member 40 by virtue of the angled section 52. In effect, therefore, the position of the adjustable stop member 40 may be varied in the one direction by releasing the latch dog 47 and introducing additional fluid into the cylinder 61 or, the member 40 may be shifted rearwardly by releasing the latch dog 47 and at the same time permitting the piston 62 to drop back within the cylinder 61, as by permitting a flow of oil from the cylinder 61 back to the valve unit on the tractor.

Figure 4:
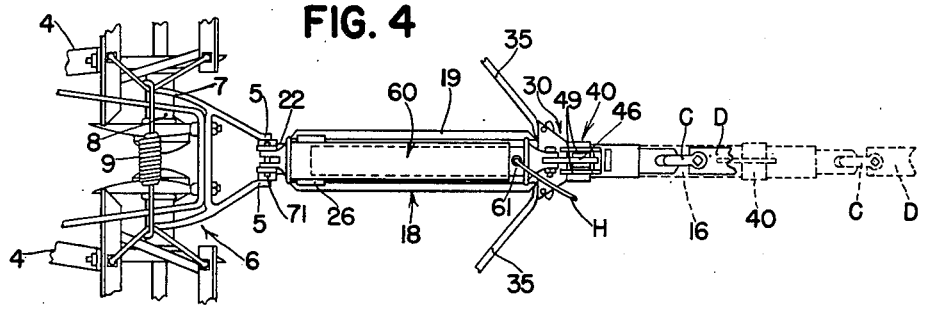
Figure 4 is a fragmentary view somewhat similar to Figure 3, showing the parts in the positions they occupy when the gangs have been forced into their straightened position by releasing the hydraulic fluid and backing the tractor.

While during normal conditions the power unit 60 is ordinarily operated to force the gangs into their angled position (Figure 1) by forcing the rear slide 30 up against the adjustable stop 40 and the gangs then held in their angled position by the fluid hydraulically locked in the cylinder 61, the gangs normally being straightened merely by releasing the fluid from the cylinder 61 and permitting the outer ends of the gangs to drop back into their straightened position under the influence of the forward draft, it is nevertheless possible to force the gangs into their straightened position. It will be remembered that while the normal position of the drawbar channel 16 is in its extended or forward position, the same is slidable rearwardly relative to the rear drawbar section 18, and it will be seen, particularly from Figure 1, that by releasing the oil from the hydraulic cylinder 61 and, while the oil pressure is thus released, backing the tractor relative to the harrow, the resulting rearward movement of the drawbar channel 16 and the front slide 40 will act through the rear slide 30 and the draft links 35 to force the outer ends of the gangs rearwardly, as shown in Figure 4. This particular arrangement has the advantage that, in the event the tractor should be driven onto soft ground and start to mire down instead of propelling the harrow, the latter being in normal angled position, the tractor may be backed and, with the oil released from the cylinder 61, the gangs will be straightened, as described above. Then, with the draft lightened, the tractor may be driven over the soft spot with the harrow in straightened position, since much less traction would be required to advance the harrow in a straightened position than if the harrow were set in its angled or operating position.

Referring now to Figure 5, in which parts which are the same as those described above will be indicated by the same reference numeral, the hydraulic unit of Figure 5 is indicated in its entirety by the reference numeral 99a and includes a hydraulic cylinder 100 having ears 101 connected by screws 102 to a brace or cross plate 112 which is fixed, as by welding, to the angles 19 adjacent the rear end of the drawbar section 18, there being a block 220 or the like so as to dispose the cylinder 100 at the proper level. The front end of the cylinder 100 is open and slidably receives a piston 105, the rear end of which is provided with suitable sealing means 106, such as a leather cup fastened to the piston 105 in the usual way. The unit 99a therefore constitutes a single action ram unit. The front end of the piston 105 is recessed, as at 107, and pivotally receives the rear end of a piston rod 108, the latter being swingably mounted for limited movement on a pivot pin 109 carried by the front end of the piston 105. The piston rod 108 extends forwardy and is provided with a reduced end 113. At its front end 113 the piston rod 108 is connected by a bracket 221 to a front slide 30a which is similar to the front slide 30 described above. The latch 30a consists of upper and lower plates 31a and 32a, connected in any suitable way by side plates so as to be connected in spaced apart relation on opposite sides of the channel 16 and freely movable along the latter. Preferably, the bracket 221 is connected by a bolt 223 or the like to the upper plate 31a of the front slide 30a. The draft links 35 are connected to the upper and lower plates 31a and 32a of the front slide 30a by bolts 223a that connect the upper and lower plates 31a and 32a, in substantially the same way these parts are connected to the slide 30 in Figures 1 to 4.

The front latch for the unit 99a shown in Figure 5 is substantially identical with the latch 40 described above, and is indicated in its entirety by the reference numeral 40b. The latch 40b is mounted upon a pair of relatively short plates 225 and 226 connected in spaced apart relation by side plates 227. The mechanism per se of the latch 40b is the same as is shown in Figure 2, and hence the same reference numerals have been employed. The latch 40b is freely slidable on the channel 16 whenever the lever 46 is swung forwardly, in a counter-clockwise direction, as viewed in Figure 5. A spring catch 230 is secured at its rear end to the front slide 30a, preferably to the upper plate 31a thereof, and at its forward end is formed with oppositely inclined slanting sections 231 and 232. The length of the spring catch 230 is sufficient to permit the section 232 to engage the front edge of the latch plate 225 when the slide 30a is in a forward position, shown in dotted lines in Figure 5, up against the latch unit 40b.

The operation of the hydraulic unit shown in Figure 5 is the same as the operation of the form shown in Figures 1–4.

The hydraulic ram units 60 or 99a may be considered either as a part of the disk harrow or as a part of the tractor. If the former, the implement may be readily disconnected from the tractor by releasing the clevis C and disconnecting the tube or hose H (Figures 1–4) or the hose 146 (Figure 5), at any suitable point, as at one or the other of the connections 145 or 147, or at some point particularly designed to provide a ready disconnection. If the hydraulic unit is a part of the tractor, which is the preferred form, the connections 145 and 147 are left as permanent connections which in all normal use are never detached. Instead, the hydraulic unit, 60 or 99a, is readily disconnected from the implement by removing the bolt means 64 and 71 which releasably connect the unit 60 to the brackets 65 and 72 (Figures 1–4) or the screws 102 and nut 114 (Figure 5). If desired, any suitable form of quick disconnecting means may be used for attaching the unit to the implement.

While I have shown and described above the preferred structure in which the principles of the present invention have been incorporated, it is to be understood that my invention is not to be limited to the particular details shown and described above, but that, in fact, widely different means may be employed in the practice of the broader aspects of my invention.

What I claim and desire to secure by Letters Patent is:

1. A disk harrow comprising a pair of disk gangs, a drawbar construction with which the inner ends of said gangs are pivotally connected for generally horizontal swinging movement into and out of angled working position, said drawbar construction including a forwardly extending draft receiving part, a member slidable on said part and operatively connected with the outer ends of said gangs, a second member adapted to be adjustably fixed to said drawbar part for limiting the forward movement thereof and thereby defining the angled position of the gangs, and a single action ram unit including a cylinder and a plunger, one anchored to said drawbar and the other connected with said slidable member, whereby extension of said plunger relative to said cylinder forces said slidable member forwardly and angles the gangs, and means for releasing the pressure in said cylinder to provide for soil pressure against the outer disks in angled position shifting said slidable member and said plunger into the cylinder, thereby forcing fluid out of the cylinder and causing said gangs to move back into their straightened position.

2. In a disk harrow adapted to be propelled by a tractor, a frame, a pair of disk gangs pivoted at their inner ends to said frame for generally horizontal swinging movement between angled and straightened positions, two relatively slidable members, one connected with said frame and the other slidable generally fore and aft relative to said one member, draft links connecting said slidable member with the outer ends of said gangs, and a hydraulic unit deriving power from the tractor and including a cylinder connected with one of said members and a piston connected with the other member for shifting said slidable member and swinging said gangs about their points of pivot connection with said frame into their angled position.

3. A tractor disk harrow comprising a disk gang, drawbar means connecting said gang with the tractor and including two parts, one mounted for movement on the other, means slidable on said one part, means for operatively connecting said slidable means with said disk gang and with said one part whereby movement of the latter in one direction shifts said disk gang in one direction, and power means acting against said slidable means for moving the latter along said one part in the other direction for shifting said gang the other direction.

4. A tractor disk harrow comprising means serving as a frame, a pair of gangs movably connected therewith for generally horizontal swinging movement, a drawbar construction comprising a longitudinally shiftable member adapted to be connected to the tractor, a part shiftable relative to said member and connected with said gangs, releasable power means acting against said part for moving it in a direction to force said gangs into angle, and means for connecting said part and member whereby rearward movement of the latter, such as that caused by backing the tractor, forces said gangs into a straightened position, said gangs also tending to move into a straightened position by forward travel with said power means released.

5. An implement comprising a frame, an element movably connected with said frame and adapted for movement into a transport position and into any one of a number of different working positions, a draft receiving member movably connected with said frame, stop means limiting the forward movement of said draft receiving member relative to said frame, a part slidable on said draft receiving member, means connecting said part with said element whereby movement of said part relative to said frame shifts said element, power means carried by said frame and said member and acting between said frame and said part for shifting said element in one direction, and means for connecting said part with said member whereby rearward movement of said member acts through said part for shifting said element in the other direction.

6. An implement comprising a frame, an element movably connected with said frame and adapted for movement into a transport position and into any one of a number of different working positions, a draft receiving member movably connected with said frame, stop means limiting the forward movement of said draft receiving member relative to said frame, a part slidable on said draft receiving member, means connecting said part with said element whereby movement of said part relative to said frame shifts said element, power actuated means connected between said frame and said part for shifting said element into any one of different working positions, said power means being releasable to permit rearward movement of said part, and means optionally connectible with said member for causing rearward movement of the latter to shift said part rearwardly and thereby move said element in the other direction.

7. A disk harrow comprising a disk gang swingable between transport and angled working positions, means for transmitting forward draft to the inner end of said gang, including a pair of relatively movable parts, one being pivotally connected with the inner end of said gang and the other being slidable relative to said one part, means transmitted through said other part to said one part, a power unit connected at one end with said one part, a slide on said other part to which the other end of said power unit is connected, means connecting the slide with the outer end of said gang for shifting the latter into its angled working position, and means for optionally connecting said other part with said slide whereby rearward movement of said other part relative to said one part acts through said slide for shifting said gang into its transport position.

8. A tractor disk harrow comprising a pair of disk gangs, frame means with which the inner ends of the gangs are connected, a member shiftable with respect to said frame means and adapted normally to occupy a forwardly extended position relative to said frame means, means for connecting said shiftable member with the outer ends of said gangs, comprising a slide on said member, links connecting said slide with the outer ends of said gangs, and a stop on said shiftable member forward of said slide and adapted to be fixed to said shiftable member whereby backing of the tractor acts to move said shiftable member rearwardly and force the gangs into a straightened position, and power means acting against said frame means and said slide, when the latter is in a rear position relative to the extended shiftable member, for shifting said gangs into an angled position.

9. The invention set forth in claim 8, further characterized by means fixing said stop member in different positions on said shiftable member.

10. A disk harrow comprising a disk gang movable between a transport position and an angled working position, a two-part drawbar construction including two relatively extensible and contractible members, one being connected with said disk gang and the other being adapted to receive draft for propelling the harrow and adapted normally to remain in extended position relative to said one member, stop means limiting the forward movement of said other member relative to said one member, a part slidable on said other member, means connecting said part with said gang whereby movement of said part in a generally fore and aft direction relative to said one member shifts said gang, power actuated means connected between said one member and said slidable part for shifting said gang in one direction into any one of different working positions, said power means being releasable to permit rearward movement of said part relative to said one member, and means optionally connectible with said one member for causing rearward movement of the latter to shift said part rearwardly and thereby move said gang in the other direction.

11. The invention set forth in claim 8, further characterized by said power means comprising a hydraulic piston and cylinder unit mounted with one end connected to said frame means and the other end connected to said slide.

12. The invention set forth in claim 8, further characterized by said power means comprising hydraulic mechanism including a control unit on the tractor, a hydraulic piston and cylinder unit mounted with one end removably connected to said frame means and the other end removably connected to said slide, and a hose connecting said piston and cylinder unit with the control unit on the tractor.

13. A tractor disk harrow comprising a pair of disk gangs, frame means with which the inner ends of the gangs are connected, a member shiftable with respect to said frame means and adapted to be connected with said tractor to receive draft therefrom, power means acting between said frame means and the gangs for forcing the latter into angled working position, and means connecting said shiftable member with said gangs whereby backing of the tractor acts through the shiftable member for forcing the gangs into a straightened position.

14. A tractor disk harrow comprising a disk gang, drawbar means connecting said gang with the tractor and including two parts, one mounted for movement on the other, means slidable on said one part, means for connecting said slidable means with one end of said disk gang and with said one part, whereby movement of the latter in one direction shifts said disk gang in one direction, means connecting said other part with the other end of said disk gang, and power means acting against said other part and through said slidable means against said one end of said gang whereby operation of said power means shifts said gang in the other direction.

15. A disk harrow adapted to be propelled by a tractor having a power control unit including a hydraulic piston and cylinder device, control valve means and hose means permanently connected at one end with said hydraulic piston and cylinder device and at the other end with said control valve means in normally non-detachable relation, whereby said hydraulic piston and cylinder device forms a normally permanent part of the tractor, said disk harrow comprising a pair of disk gangs, drawbar means including two relatively movable members, means connecting one of said relatively movable members with the inner end of said gangs and the other of said relatively movable members with the outer ends of said gangs, and means for mounting said piston and cylinder device on said drawbar means, including means establishing a quick detachable connection for one end of said device on one of said relatively movable members and means establishing a quick detachable connection for the other end of said device on the other of said relatively movable members.

16. A disk harrow adapted to be propelled by a tractor having a power control unit including a hydraulic piston and cylinder device, control valve means and hose means permanently connected at one with said hydraulic piston and cylinder device and at the other end with said control valve means in normally non-detachable relation, whereby said hydraulic piston and cylinder device forms a normally permanent part of the tractor, said disk harrow comprising a pair of disk gangs, drawbar means including two relatively slidable members, means connecting one of said relatively slidable members with the inner end of said gangs, a slide on the other of said relatively slidable members and operatively connected with the outer ends of the gangs, whereby movement of the slide relative to said one member shifts said gangs, and means for mounting said device on said drawbar means so that one end thereof acts through said slide and the other end thereof reacts against said one member for shifting said gangs.

17. A tractor disk harrow comprising a disk gang, drawbar means connecting said gang with the tractor and including two parts, one mounted for generally longitudinal movement on the other, means connecting said one part with one end portion of said disk gang, means connecting the rear portion of said other part with the other end portion of said disk gang, and means including a hydraulic piston and cylinder unit disposed generally longitudinally on said parts and having one end connected with said one part and the other end portion connected with said other part whereby power may be applied through said hydraulic piston and cylinder unit for moving one of said parts relative to the other and consequently angularly shifting said disk gang.

18. A tractor disk harrow comprising a disk gang, drawbar means connecting said gang with the tractor and including two parts, one mounted for movement on the other, means slidable on said one part, means operatively connecting said slidable means with said disk gang and with said one part whereby movement of the latter in one direction relative to said other part will shift said disk gang, and controllable power means acting through said other part against one end portion of said gang and through said slidable means on said one part against the other end portion of said gang for shifting the latter in the other direction.

19. A farm implement adapted to be propelled by a tractor having a power control unit including a hydraulic piston and cylinder device, control valve means and hose means permanently connected at one end with said hydraulic piston and cylinder device and at the other end with said control valve means in normally non-detachable relation, whereby said hydraulic piston and cylinder device forms a normally permanent part of the tractor, said farm implement including ground working tool means movable between different positions, drawbar means including two relatively movable members, means connecting said relatively movable members with said tool means whereby moving one of said members relative to the other serves to shift said tool means, and means for mounting said piston and cylinder device on said drawbar means, including means establishing a quick detachable connection for one end of said device on one of said relatively movable members and means establishing a quick detachable connection for the other end of said device on the other of said relatively movable members.

CHARLES H. WHITE.